(12) United States Patent
Warren et al.

(10) Patent No.: US 8,555,258 B2
(45) Date of Patent: *Oct. 8, 2013

(54) SOFTWARE PERFORMANCE ANALYSIS USING DATA MINING

(75) Inventors: Christina E. Warren, San Jose, CA (US); David V. Payne, Santa Clara, CA (US); Darin Adler, Los Gatos, CA (US); Maciej J. Stachowiak, San Francisco, CA (US); Bertrand P. Serlet, Palo Alto, CA (US); Christopher A. Wolf, Raleigh, NC (US)

(73) Assignee: Apple Inc., Cupertino, CA (US)

( * ) Notice: Subject to any disclaimer, the term of this patent is extended or adjusted under 35 U.S.C. 154(b) by 915 days.

This patent is subject to a terminal disclaimer.

(21) Appl. No.: 12/623,011

(22) Filed: Nov. 20, 2009

(65) Prior Publication Data

US 2010/0107145 A1    Apr. 29, 2010

Related U.S. Application Data

(63) Continuation of application No. 10/872,207, filed on Jun. 19, 2004, now Pat. No. 7,644,397.

(51) Int. Cl.
*G06F 9/44*    (2006.01)

(52) U.S. Cl.
USPC ........... 717/131; 717/125; 717/126; 717/127; 717/128

(58) Field of Classification Search
None
See application file for complete search history.

(56) References Cited

U.S. PATENT DOCUMENTS

| 5,828,883 A | * | 10/1998 | Hall | 717/133 |
| 2005/0198617 A1 | * | 9/2005 | Kim et al. | 717/109 |

OTHER PUBLICATIONS

Shikari 2.5 User guide, Apple, Oct. 2002.*

* cited by examiner

*Primary Examiner* — Insun Kang
(74) *Attorney, Agent, or Firm* — Novak Druce Connolly Bove + Quigg LLP

(57) ABSTRACT

A system, method, and computer program for analyzing code execution and software performance characteristics are disclosed. Samples of code during run-time or from crash logs can be displayed as both a top-down tree of calls from a particular function and a bottom-up tree of calls to the particular function. Data mining techniques, including filtering and focusing, remove code that is not of interest and display code that is more relevant to performance analysis. In particular, functions contained in libraries such as system libraries can be stripped from view. The cost associated with an excluded function can be propagated to a calling function, in either the top-down or bottom-up tree.

14 Claims, 10 Drawing Sheets

| Total | Symbol Name |
|---|---|
| 0.652 | -[SKTGraphicView selectGraphic:] |
| 0.651 | -[NSObject(SKTPerformExtra... |
| 0.651 | -[SKTGraphicView selectAll:] |
| 0.651 | main |
| 0.651 | _start |
| 0.651 | start[STACK TOP] |

210

| ! | Total (s) ▽ | Symbol Name | Library Name |
|---|---|---|---|
|   | 0.652 | ▽ -[SKTGraphicView selectGraphic:] | Sketch |
|   | 0.651 | ▽ -[NSObject(SKTPerformExtra... | Sketch |
|   | 0.651 | ▽ -[SKTGraphicView selectAll:] | Sketch |
|   | 0.651 | △ main | Sketch |
|   | 0.001 | △ -[SKTGraphicView selectAll:] | Sketch |
|   | 0.618 | △ -[SKTGraphic drawHandleAtPo... | Sketch |
|   | 0.554 | △ -[SKTGraphic drawinView:isSel... | Sketch |
|   | 0.326 | △ -[SKTGraphicView invalidateGr... | Sketch |

| Total | Symbol Name |
|---|---|
| 2.524 | start |
| 2.524 | _start |
| 2.524 | main |
| 0.994 | -[SKTGraphicView selectAll:] |
| 0.993 | -[NSObject(SKTPerformExtra... |
| 0.988 | -[SKTGraphicView selectGra... |
| 0.329 | -[SKTGraphicView invalidat... |
| 0.003 | -[SKTGraphicView graphics]... |

310

| ! | Total (s) ▽ | Self (s) | Symbol Name |
|---|---|---|---|
|   | 2.524 | 0 | ▽ start |
|   | 2.524 | 0 | ▽ _start |
|   | 2.524 | 0.014 | ▽ main |
|   | 1.515 | 0.049 | △ -[SKTGraphicView drawRect:] |
|   | 0.994 | 0 | -[SKTGraphicView selectAll:] |
|   | 0.001 | 0 | -[SKTGraphic drawingBounds] |

FIG. 5

| Self | Line | Total | Code |
|---|---|---|---|
| | 112 | | return (([_selectedGraphics IndexOfObjectIdenticalTo:graphic] ==NSNotFound) ? NO |
| | 113 | | } |
| | 114 | | |
| | 115 | | - (void)selectGraphic:(SKTGraphic *) graphic { |
| 171 | 116 | 171 | unsigned curIndex = [_selectedGraphics IndexOfObjectIdenticalTo:graphic]; |
| 64 | 117 | 64 | if (curIndex == NSNotFound) { |
| 365 | 118 | 365 | [[self undoManager] prepareWithInvocationTarget:self deselectGraphic:graphic]; |
| 11 | 119 | 11 | [self drawDocument] undoManager] setActionName:NSLocalizedStringFromTable(@"S |
| | 120 | | [_selectedGraphics addObject:graphic]; |
| | 121 | 322 | [self:invalidateGraphic:graphic]; |
| | 122 | | -pasteCascadeDelta = NSMakePoint(SKTDefaultPasteCascadeDelta, SKTDefaultPasteC |
| 26 | 123 | 27 | [NSNotificationCenter defaultCenter] postNotificationName:SKTGraphicViewSelect |
| | 124 | 6 | [self updateRulers]; |
| | 125 | | } |
| 1 | 126 | 1 | } |
| | 127 | | |
| | 128 | | - (void)deselectGraphic: (SKTGraphic *)graphic { |
| | 129 | | unsigned curIndex = [_selectedGraphics IndexOfObjectIdenticalTo:graphic]; |

FIG. 6

Time Profile-3 in Sketch (540).mshark

Profile | Chart | ☒ -[SKTGraphicView selectAll:]

Source File: [(100.9%) SKTGraphicView.m] Function:

| Self | Total | Line △ | Code |
|---|---|---|---|
| | | 68 | - (NSArray *) graphics { |
| | | 69 | return [ [ [self drawWindowController] document] graphics]; |
| | | 70 | } |
| | | 71 | |
| | | 72 | // Display invalidation |
| | | 73 | - (void)invalidateGraphic:(SKTGraphic *)graphic { |
| 49 | 49 | 74 | [self setNeedsDisplayInRect: [graphic drawingBounds ] ]; |
| | 27.3 | 75 | if(![self:graphics]:containsObject:grahic]){ |
| | | 76 | [self deselectGraphic:graphic];    //deselectGraphic will call invalidateGraphic |
| | | 77 | } |
| | | 78 | } |
| 270 | 79 | | |
| | | 80 | - (void)invalidateGraphic: (NSArray *)graphics { |
| | | 81 | unsigned i, c = [graphics count]; |
| | | 82 | for (i=0; i<c; i++) { |
| | | 83 | [self invalidateGraphic:[graphics objectAtIndex:i] ] ; |
| | | 84 | } |
| | | 85 | } |

Source | Assembly

0x930c | 0x93cc 0 of 319 samples in self (0.0%). 0 of 322 samples total (0.0%). 1 of 1293 lines (0.1%) selected CPU Model: 7450

FIG. 7

SOFTWARE PERFORMANCE ANALYSIS USING DATA MINING

CROSS-REFERENCE TO RELATED APPLICATIONS

This Application is a continuation application which claims priority to U.S. patent application Ser. No. 10/872,207 (now U.S. Pat. No. 7,644,397) filed 19 Jun. 2004, entitled "Software Performance Analysis Using Data Mining" and which is hereby incorporated by reference in its entirety.

BACKGROUND

The present invention relates generally to analyzing software performance, and more particularly, to a system, method, and program for analyzing code execution in order to analyze and improve software performance by rapidly identifying of areas of code based on cost and use, and which may be candidates for optimization.

RELATED ART

Performance is an important aspect of software design. If an application does not perform well, users will not likely want to use that application. Performance is a subjective term referring to the general way in which something operates. Performance may include how efficiently system resources (e.g., CPU, memory, and hard disk drive) are used. There are aspects of performance, including but not limited to speed, memory footprint, memory turnover, memory usage, file-system usage, etc., that can be measured. Improving on these measurements increases the efficiency of the software.

The reason for poor performance of a software program is not always apparent. In particular, large-scale software can be extremely complex, with multiple layers and many modules, such that implementation details (those causing performance problems) are often hidden across layers and modules.

Software programs can be "sampled" when various events occur at runtime. Samples may be taken, for example, at a specified time interval (time-based sampling). When a sample is taken, the program's stack backtrace and other information can be recorded, and entered into a "trace table." A trace table may have many thousands of such entries, depending on how many samples were taken.

When a sampling run is complete, the trace table can be analyzed to build a single function call tree, showing the full tree of all function calls that were made, from the application's main entry point to the lowest leaf function. That "top-down" function call tree can be navigated to see the pattern of function calls in the application, to see overall how resources were used by the application. It is difficult, however, to see all the ways that a particular "leaf" function (i.e., a terminal function with no children) was reached, since that leaf function may appear at the ends of many different branches of the function call tree.

A function call tree can be "inverted" to create a list of all leaf function calls, and for each such call, a "bottom-up" function call tree of all the ways that the leaf function call was reached can be shown. In many cases, however, the leaf function calls are system-level functions that are not interesting to the programmer.

SUMMARY

In many circumstances, it is difficult to see any "hot spots" of program resource usage through either top-down or bottom-up viewing of complete function call trees. For example, the resources might be consumed by many calls in the middle of the call tree, in the process of navigating up and down through a tree-structured hierarchy of data (such as the hierarchy of graphical container elements on a web page).

In analyzing software performance, the impact of an operation on performance may be considered as a function of cost(operation)*use(operation). Traditional performance tools concentrate more on cost than on use. While prior art tools provide information about where time is being spent and how often functions are called, they do not provide any indication of how the function was called during program execution. To better understand a program's behavior so as to provide insight into how a program may be optimized, use-based tracing would be desirable.

A need therefore exists for a system, method, and tool for analyzing software performance characteristics that overcomes the limitations of the prior art. The present invention improves upon the prior art by quickly locating "hot spots" or problem areas of code which may be hindering optimal performance. By performing various data mining operations, the systems, methods, and programs of the present invention advantageously hide areas of code that are relatively uninteresting, allowing developers to focus on more relevant areas of code. Thus, the present invention allows for quick and efficient analysis of code execution by quickly finding areas of code that can be improved and which serve as prime candidates for optimization of software performance. Oftentimes, dramatic performance gains may be achieved by optimizing only a small number of key functions which are responsible for the vast majority of CPU time used by a program.

In accordance with certain embodiments of the present invention, various data mining operations may advantageously be performed. Exclusion operations allow for automatically "pruning" the call trees to hide data that is not of interest. Exclusion operations remove a symbol or group of symbols from the samples and effectively charge their costs to their callers. For example, the functions from a specified library can be excluded from view, and the costs of those functions can be charged or propagated to the functions calling into that library. Furthermore, functions in core system libraries can be automatically hidden, to allow the software developer to focus on application logic. The cost of the removed system library and framework calls can be applied to the application level functions or methods that are calling them.

The cost of a function may be represented by, for example, time spent executing that function. Cost may also be represented in terms of sample counts, i.e., how many samples contained that function. Cost may also be represented by memory bytes. Cost may also be represented in terms of number of memory allocations.

Focus operations allow developers to focus their attention on a specific portion of the call tree. For example, a call tree can be limited to a particular function and all functions that are called during its invocation. All portions of the callstack that are callers of that function or callstacks that do not contain the specified function can be removed from the outline.

When focusing on a particular function, two call trees can be displayed concurrently: (1) a top-down call tree showing the paths from the particular function to all leaf functions called by it; and (2) a bottom-up call tree showing the paths from the leaf functions called by the particular function to the particular function. Presenting both trees provides a better sense of the cost of the function and a better understanding of the commonality as well as the differences.

The present invention also provides unique advantages with respect to debugging applications and analyzing crash logs. Various software systems provide mechanisms for users to submit crash logs of crashed applications to the system vendor. With large numbers of users of complex software applications, a large number of crash logs can be received daily, making it difficult and cumbersome to review the crash logs and fix the underlying problems. By applying the data mining techniques of the present invention to crash logs, large amounts of data from incoming crash logs can be automatically consolidated, classified, and prioritized.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 2 depicts a portion of an exemplary callstack table (heavy view).

FIG. 3 depicts a portion of an exemplary callstack table (tree view).

FIGS. 4-7 depict exemplary code browser screens.

DETAILED DESCRIPTION

When processes are running on a computer system, the processes and the system's CPU and memory can be "sampled" when various events occur at runtime. Samples may be taken, for example, based on a specified time interval (time-based sampling). Samples may also be taken based on a specified function call (function call sampling). For example, samples may be taken based on a memory allocation call (memory allocation sampling). Samples may also be taken based on a cross-library call. Samples may also be taken based on a specified hardware or operating system ("OS") event such as a cache miss or instruction stall, etc. (event sampling). In addition, CPU performance counters can be used to trigger samples. Memory controller performance counters can also be used to trigger samples. Processor interface bus counters may also be used to trigger samples. OS performance counters pertaining to virtual memory behavior (e.g., page faults, zero-fill faults, and copy-on-write faults, etc.), system calls, scheduling behavior (e.g., context switches, handoffs, etc.), disk I/O (e.g., synchronous, asynchronous, reads, writes, meta data, etc.), and various exceptions (e.g., DSI (data storage interrupts), ISI (instruction storage interrupts), etc.) may also be used to trigger events. Samples may also be taken based on time/allocation in Java (Java trace).

Indeed, software programs can have poor performance due to any of a number of different problems, including but not limited to the following: bad algorithms, excessive memory allocation, excessive locking, disk I/O, network calls, inter-process communication, and executing the same operation more than once. Accordingly, sampling may be configured based on any of a variety of triggers that may be of interest.

The samples can include all of the processes running on the system. Alternatively, the samples can be limited to a specific process or execution state. When a sample is taken, the program's stack backtrace and other information can be recorded, and entered into a "trace table." A trace table may have many thousands of such entries, depending on how many samples were taken.

When a sampling run is complete, the trace table can be analyzed to build a single ("top-down") function call tree, showing the full tree of all function calls that were made, from the application's main entry point to the lowest leaf function. Top-down function call trees can be navigated to see the pattern of function calls in the application, to see overall how resources were used by the application.

Figure 1:
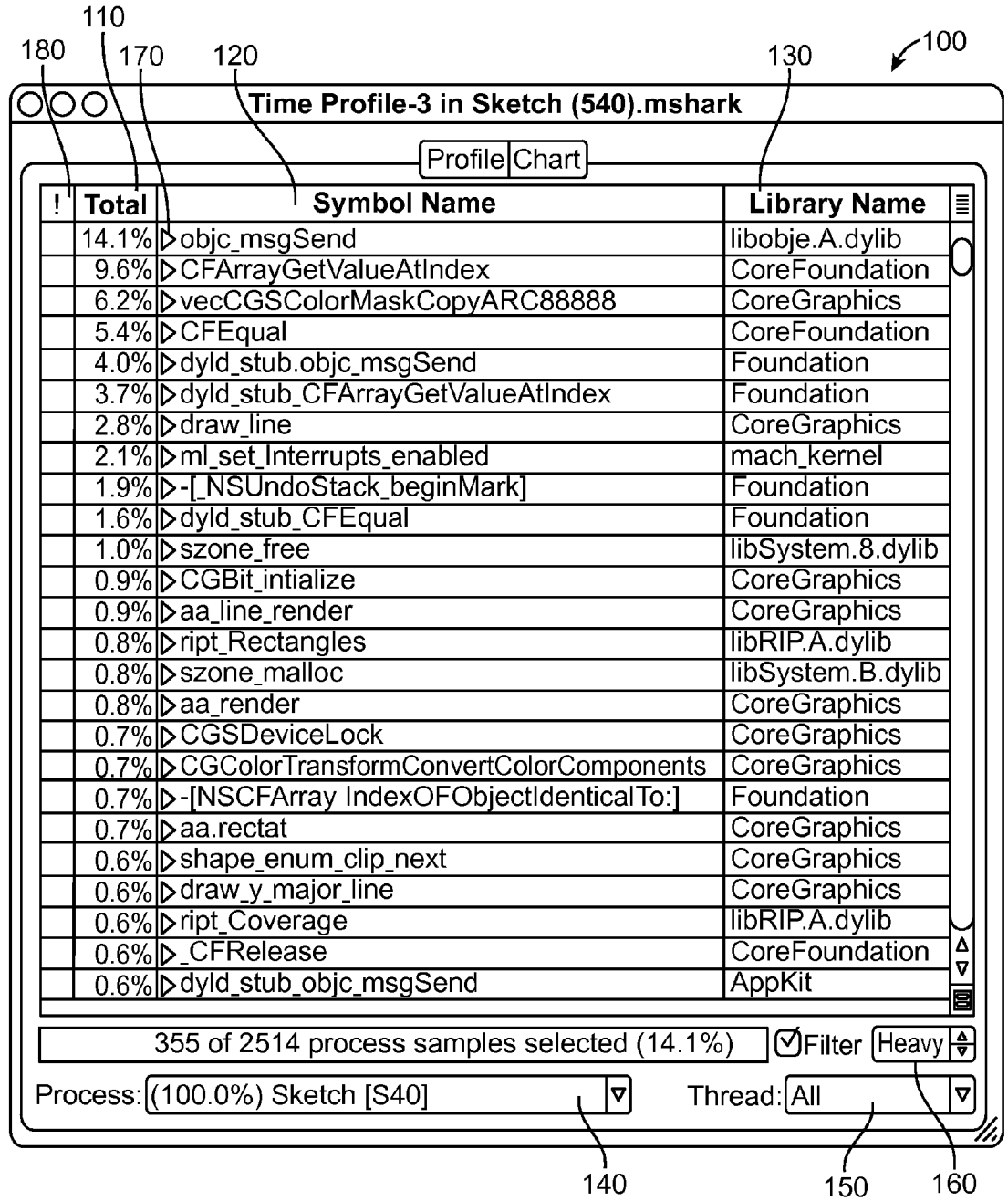
FIG. 1 depicts an exemplary sample profile.

Reference is now made to FIG. 1, which depicts an exemplary profile 100 which outlines or lists various sampled functions. The profile 100 represents a tabular summary of the total time spent in each function (Total 110, which is expressed in this example as a percentage), the function name (also referred to as the Symbol Name 120), and the name of the library to which the function belongs (Library Name 130). Instead of expressing the time as a percentage, the table may show the length of time spent in each function or the number of samples in which each function was found. In this illustrative example, the sampling was based on a time interval; however, as discussed further herein, other types of sampling may be used.

By default, the functions may be sorted in descending order of the Total 110. In the example shown in FIG. 1, 14.1% of the samples were found in the function "objc_msgSend." A flag (e.g., "!") may be set in column 180 for a particular function to indicate detection of a significant amount of time spent in that function and that further analysis may be warranted.

The flag may also indicate that tuning advice is available with respect to improving performance characteristics. For example, advice may be provided in a popup or callout suggesting alternative ways to achieve the desired functionality more quickly. The discovery of loop boundaries may also be indicated in the tuning advice. A suggestion may also be provided to remove invariant instructions (a loop invariant operation is one that does not change within the loop.) A suggestion may also be provided to unroll loops (i.e., adjust loop boundary conditions and perform several loop iterations of work within the adjusted loop). Various floating-point optimization tips may also be provided. Suggestions may also be provided to use instructions that control cache behavior or state. Advice may also be offered with respect to alignment of code in memory. Suggestions may also be made with respect to improving performance specific to a certain CPU model.

The scope of the displayed samples can be system wide. Alternatively, the scope of the displayed samples can be limited to a particular process. A process selection menu 140 may be provided which lists the sampled processes. The processes may be listed in order of descending weight in the profile. Each entry in the menu may include without limitation the following information: percent of total samples, process name, and process ID (PID). By default, the samples from all of the threads within the selected process may be merged. The scope of the displayed samples can be limited, however, to a specific thread. A thread selection menu 150 may be provided which lists the various threads.

A profile view matrix 160 may be set to "heavy" view or "tree" view. The tree view represents the top-down call tree from the application's main entry point (or focused function if focusing is enabled as discussed below) to the lowest leaf function. The tree view provides an overall picture of the program calling structure. The heavy view represents the bottom-up call tree of all ways that the leaf function call was reached. In the heavy view, which is illustrated in FIG. 1, each symbol name has a disclosure triangle 170 next to it, which may be closed by default. The disclosure triangle 170 hides or shows information related to the label of the triangle. Selecting the triangle expands or collapses the information (e.g., information pertaining to ancestor functions) it contains.

FIG. 2 depicts a portion of a screenshot of an exemplary callstack table 200 comprising representations of a heavy view of a call tree 210 and a callstack pane 220. The heavy view shows the various leaf functions and how they were called. Thus, the heavy view allows a determination to be made of which functions are the most performance critical, and to see the calling paths to those functions. Sorting the leaf functions from most expensive to least expensive can make expensive leaf functions much more apparent, with context information showing how they were called.

If a function is selected in the heavy view, the callstack pane 220 may show the stack leading up to the selected function. If a function is selected in the callstack pane 220, the heavy view 210 may automatically expand the outline to show that function. For example, if the function "main" is selected in the call tree 210, the callstack 220 may show the stack leading up to main.

FIG. 3 depicts a portion of an exemplary screenshot of a callstack table 300 comprising representations of a tree view of a call tree 310 and a callstack pane 320. The "Total" column 330 represents the amount of time spent in a function and its descendants. The "Self" column 340 represents the amount of time spent only inside the listed function.

Figure 13:
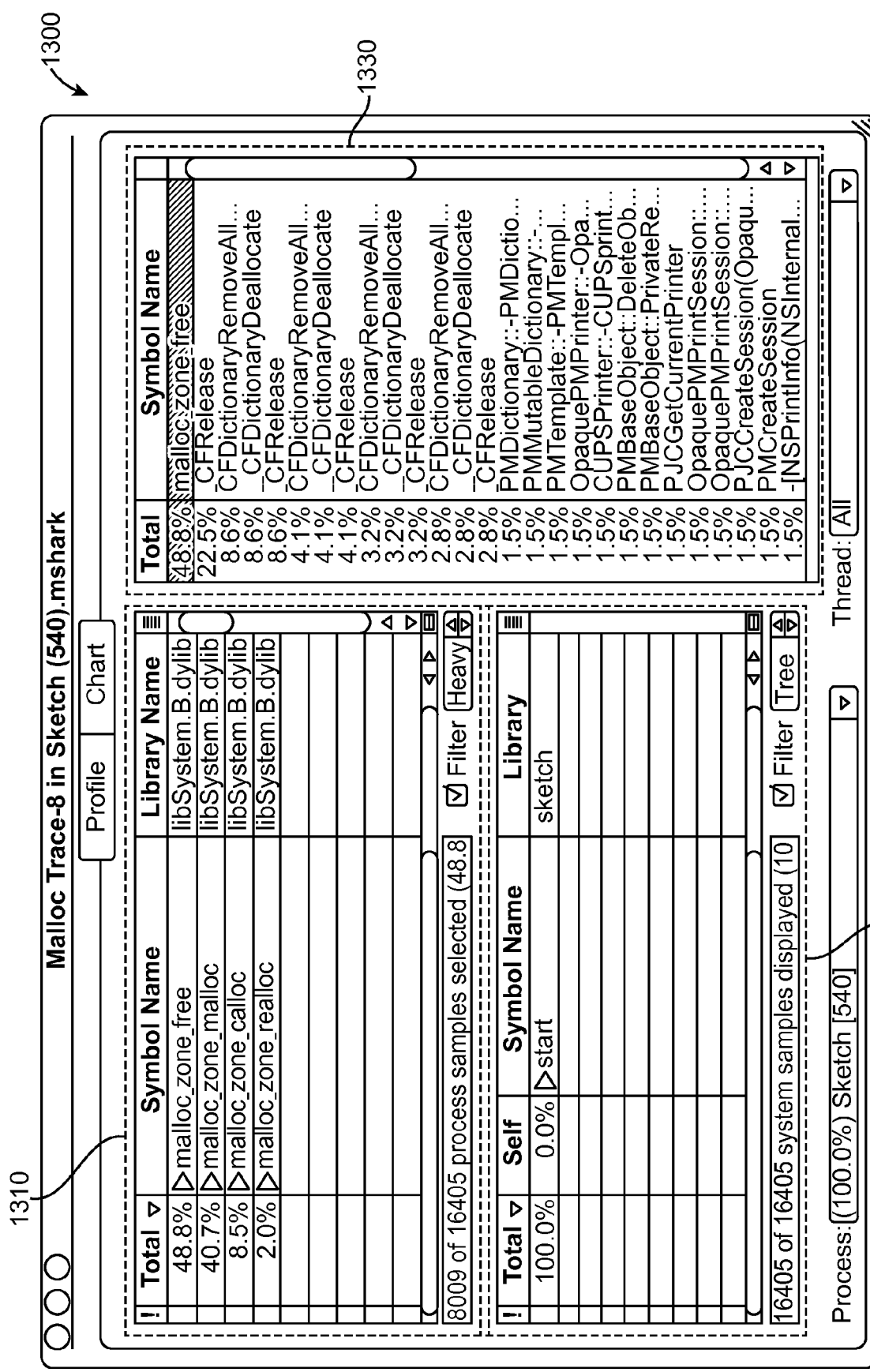

In the foregoing illustrative example, the sampling was based on a time interval; however, other types of sampling may be used as described above. For instance, sampling may occur based on memory allocation calls (also referred to as heap tracing). FIG. 13 depicts an exemplary profile 1300, which was based on a malloc trace. The display includes both a bottom-up call tree (heavy view) 1310 and a top-down call tree (tree view) 1320, and a callstack pane 1330.

Referring again to FIG. 3, selecting, e.g., by double clicking, a function in the tree view may result in the display of a code browser. The code browser provides a more detailed analysis of the code. The code browser may show the source code. The code browser may also show the assembly code. The default view may be set to show source code. Multiple colors may be used to indicate activity within a function; for example, yellow may be used to indicate sample counts that occur within the function, and orange may be used to indicate sample counts (referred to as "deep counts") that occur in functions that are called by that function.

Figure 4:
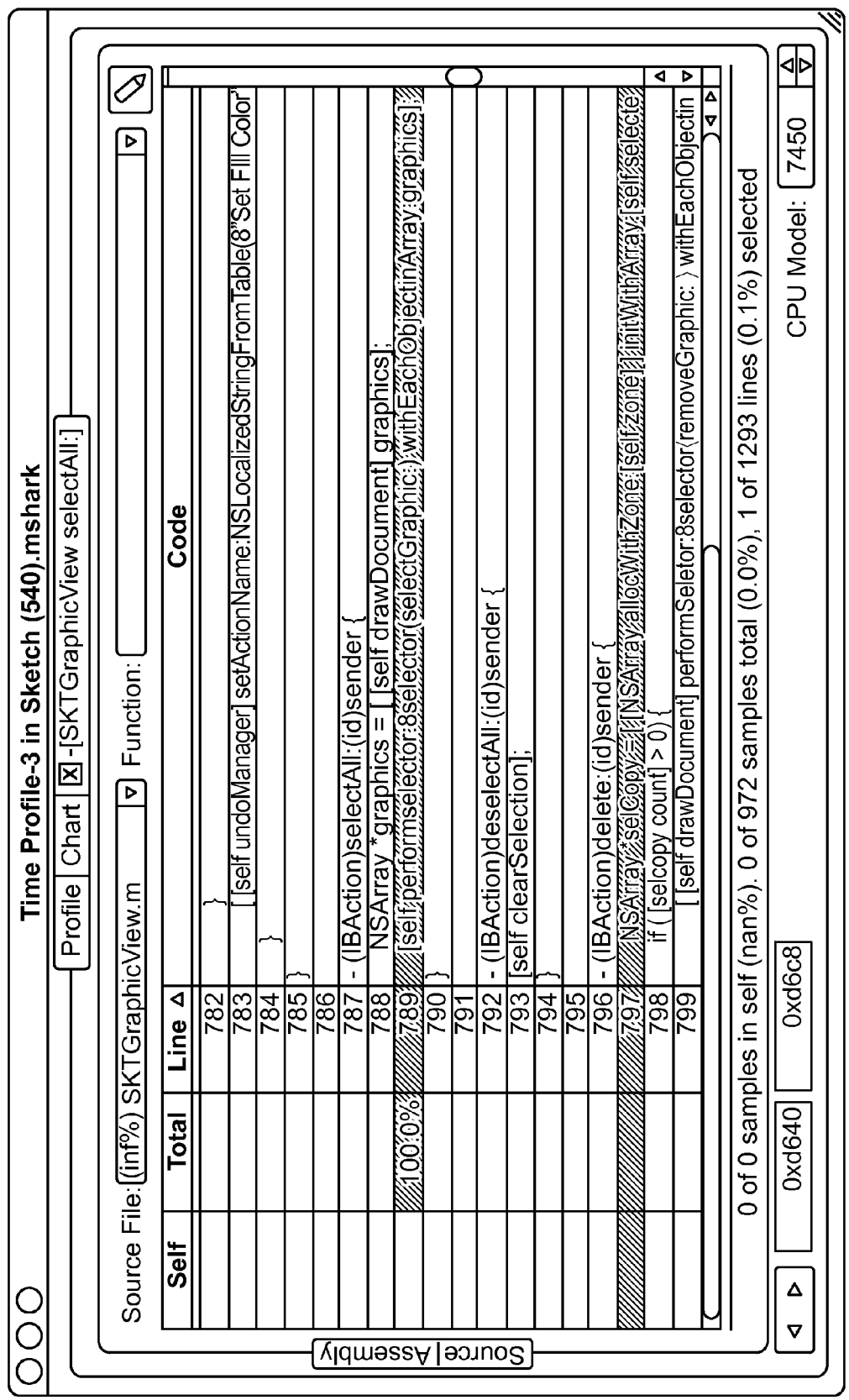
Figure 5:
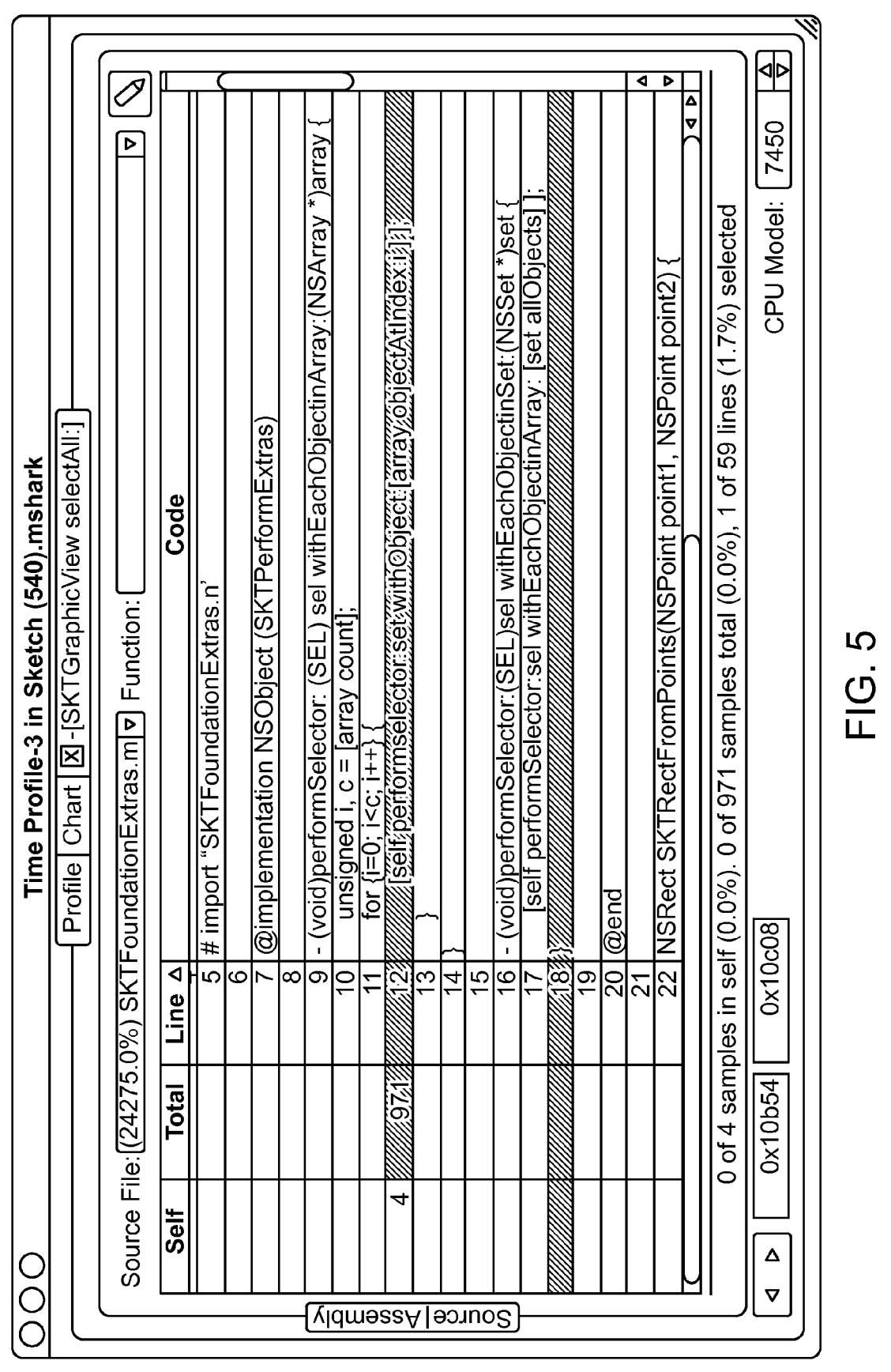

If, for example, the function "-[SKTGraphicView selectAll:]" 350 is selected (e.g., by double clicking on the function), a code browser may be displayed, such as that depicted in FIG. 4. Likewise, selecting a particular line of code in the code browser may result in the display of the function called in that line of code. For example, selecting (e.g., by double clicking) line 789 of the code (which is associated with 100% of the total time) may result in the display of a code browser such as that depicted in FIG. 5. In this case, there is a small number of samples inside of "performSelector" and a much larger number shown in the function it calls. Selecting (e.g., by double clicking) line 12 of the code may result in the display of a code browser such as that shown in FIG. 6. Color coding and shading may be used to provide visual indication of cost. For example, the color yellow may be used to highlight lines of code having costly operations, wherein the brightness of the yellow color in the line of code may be proportional to the cost.

Examining the code shown in FIG. 6 reveals certain "hot spots" of program resource usage. At line 116, there is a call to "indexOfObjectIdenticalTo:graphic." This is a linear search of the selected graphics. This is a linear search inside of a linear search, which is a fundamentally $O(n^2)$ operation. The operation in lines 118 and 119 appears to be an expensive one. This code can then be investigated to determine why these calls are so costly and whether the code can be optimized.

Line 121 shows a call out to "-[SKTGraphicView invalidateGraphic]." Selecting (e.g., by double clicking) line 121 may result in the display of a code browser such as that shown in FIG. 7. This is another linear search on the object array. Unfortunately, this time it is searching the entire set of graphics rather than just the selected one. Most likely, the global search found here is playing a big factor in the slowdown since it dominates the local linear search found previously.

Thus, two types of problems were found in the foregoing example. The first problem was $O(n^2)$ behavior introduced by implementation hiding within functions and the use of abstraction. This is one of the common pitfalls of functional programming. Each of these functions is well conceived locally but when they are used together, they combine to have poor scalability. The other problem was the use of expensive framework calls (undo manager) inside of a loop. In this case, the expensive call can be moved up to a higher level. This is an example of hoisting functionality to a higher level in the execution tree.

Figure 8:
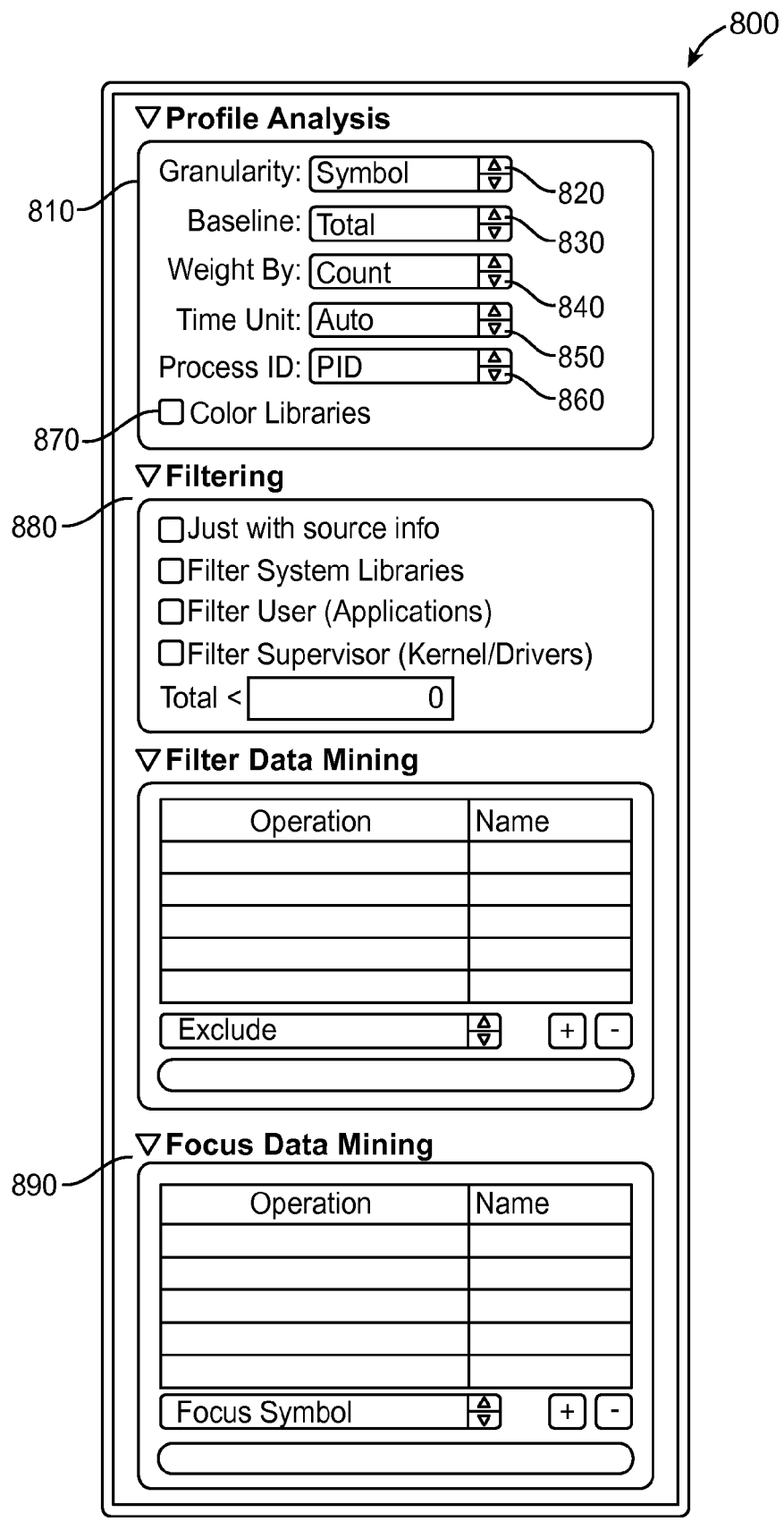
FIG. 8 depicts an exemplary user interface for callstack analysis and data mining.

Reference is now made to FIG. 8, which depicts an exemplary user interface 800 which provides controls for performing more efficient callstack analysis and data mining in accordance with certain embodiments of the present invention. In the Profile Analysis box 810 of the user interface 800, several items may be provided which can be configured according to the user's preference.

Samples may be grouped according to various categories. Granularity 820 determines at what level samples are combined. For example, samples from the same program address may be combined. Alternatively, samples may be combined according to symbol (function). Further still, samples from the same library may be combined.

By default, the baseline 830 for statistics may be the total number of displayed samples. Alternatively, the total number of samples in the current sampling session may be selected.

In addition to context and performance counter information, each sample may save the time interval since the last sample was recorded. The default "weight by" method 840 may be by sample count, wherein each sample contributes a reference count of one. During sample processing, when a sample lands in a particular symbol's address range (in the case of symbol granularity), the total reference count (or weight) of the granule is incremented by one. When samples are weighted by time, each granule may be weighted instead by the sum of the sampling interval times of all of its samples.

By default, the time unit 850 may be scaled as appropriate for the magnitude of the numbers involved. This preference allows the user to set a single time unit 850 to always be used automatically.

The process ID (PID) 860 is a unique integer assigned to each process running on the system. Samples from the same PID may be grouped together. Processes can also be identified by name, and samples from processes with the same name can be grouped together.

The Color Libraries option 870 may be switched on or off, depending on whether the user prefers to see the library names and symbols shown in different colors based on the library from which it came. Color coding the libraries provides for ease of quickly visually identifying groups of related functions.

In accordance with certain embodiments of the present invention, various data mining filtering operations 880 may be advantageously provided, including without limitation excluding and focusing 890. The filter operations 880 may comprise any of the following: Exclude Symbol (also referred to as simply Exclude), Exclude Library, Exclude System Library, Exclude No Source Info, Exclude User, Exclude Supervisor, Exclude Self, Exclude # Samples, Flatten Symbol, Flatten Library. The focusing operations 890 may comprise any of the following: Focus Symbol, Focus Library, Focus Callers of Symbol, and Focus Callers of Library.

The foregoing lists are illustrative lists of various filter operations. These lists and the accompanying parameters are provided for illustration and completeness of discussion only and not as limits on the inventive concept. Regarding the inventors' implementations of the aforementioned innovations, each of the listed operations may or may not be used or modified. Furthermore, additional operations may be created and those may differ materially from that disclosed.

The Exclude Symbol operation hides a particular symbol (function) and charges the cost of the excluded function to its parent. The Exclude No Source Info operation hides all samples from addresses or symbols for which no source code information is available. Exclude Self hides any samples of the present analysis tool. Exclude # Samples hides all functions for which the aggregate sample count is below some threshold amount. Exclude Supervisor hides all supervisor space samples (e.g., kernels and drivers). Exclude User hides all user space samples.

An extremely useful operation is Exclude Library. This operation hides all functions from a specified library and charges or propagates the costs of those functions to the functions calling into that library. Exclude System Library hides all function in core system libraries, to allow a developer to focus on application logic. For example, in the Mac OS X framework, the Exclude System Library operation would filter out all leaf function calls that occur in the Mac OS X System.framework, the Objective-C runtime (libobjc), the dynamic link library (libdyld), and the CoreFoundation and Foundation frameworks. The cost of the removed system library and framework calls would be applied to the application level functions or methods that are calling them.

In implementing the Exclude Library or Exclude System Library operations, a determination can be made if an address corresponding to a function falls within a particular range of values corresponding to the library desired to be excluded from view. A library can generally be considered as a collection of functions, and every function has an address range. If an address falls within the range corresponding to the excluded library, then it can be excluded from view.

It is noted that if an exclusion operation removes all the symbols from a particular sample, then that sample is removed from the set of samples shown. Its count effectively goes to zero.

Certain exclusion operations may automatically occur by default according to the situation. For example, when doing time-based profiling at the user level, every stack backtrace ending in any system or library calls that are known to be in "wait" states may be automatically filtered out. This leaves just the backtraces representing where actual CPU time is being spent. When analyzing memory allocations, the actual system allocation routines such as malloc( ) may be automatically filtered out in order to immediately see higher-level functions that are causing memory to be allocated. When analyzing file access patterns, system and library calls such as open( ) fopen( ), stat( ) and fstat( ) may be automatically filtered out in order to see higher-level functions that are causing files to be accessed. By presenting the higher-level functions as pivot points, the developer can see the function call tree to determine whether it was open( ) stat( ) or other functions being called.

Figure 9:
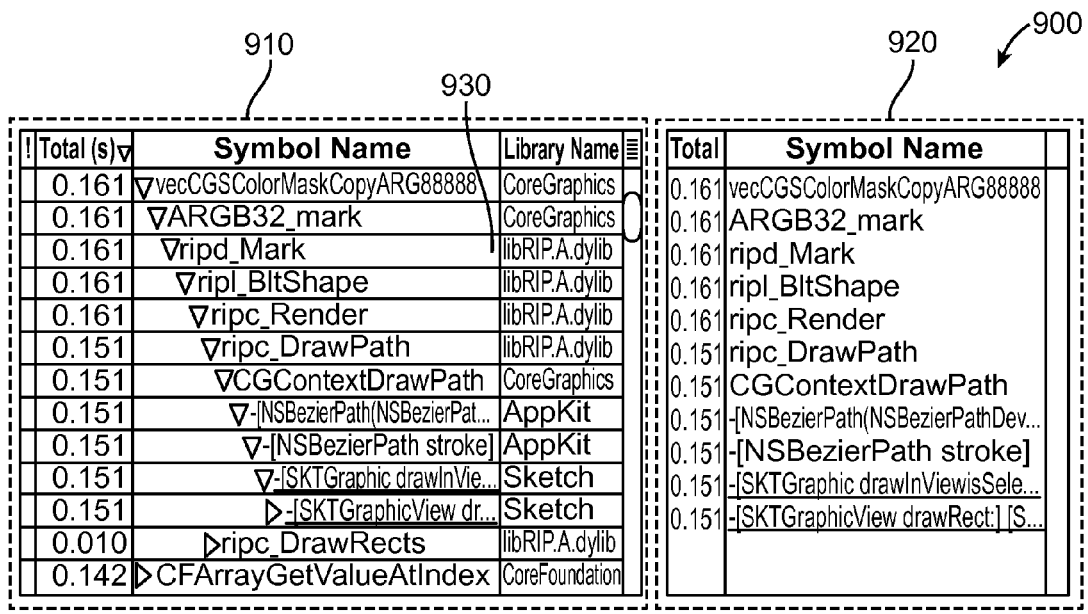
FIGS. 9-11 depict portions of exemplary callstack tables (heavy view).
Figure 10:
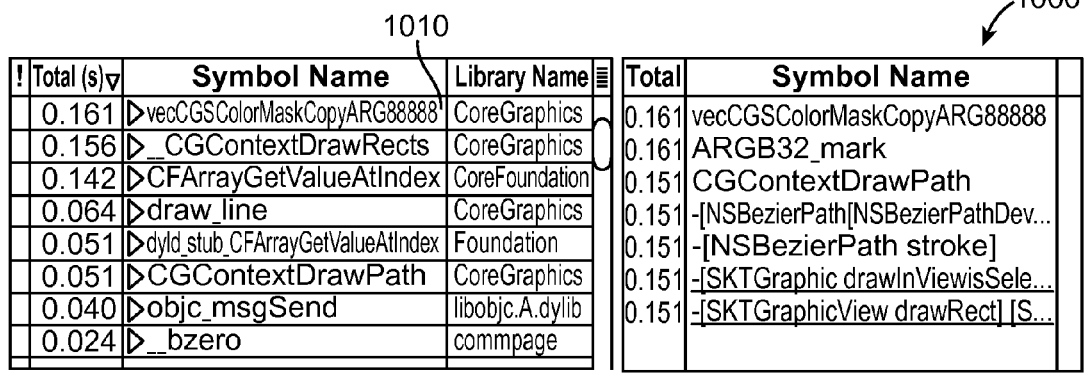

Reference is now made to FIG. 9, which shows a portion of an exemplary screenshot of a callstack table 900 including a heavy view of a call tree 910 and a callstack pane 920. If, for example, the function "ripd_Mark" (930) is selected, and the operation Exclude Library is performed, the result is a pruned callstack table such as callstack table 1000 shown in FIG. 10. As shown in FIG. 10, the functions from the library to which "ripd_Mark" belongs (i.e., "libRIP.A.dylib") have been removed from view.

Figure 11:
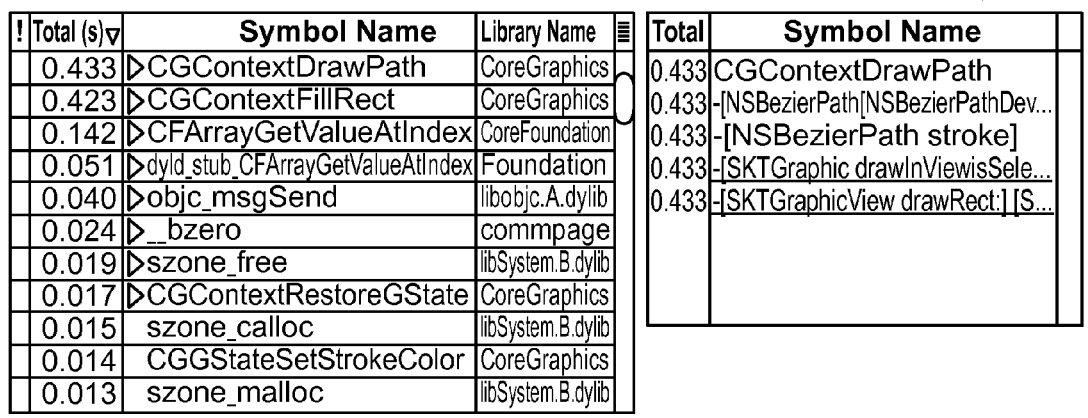

Next, for example, if the function "vecCGSColorMaskCopyARGB8888" (1010) is selected, and the operation Flatten Library is performed, the result is a pruned callstack table such as callstack table 1100 shown in FIG. 11. Time spent has converged into "CGContextDrawPath" and "CGContextFillRect."

Thus, the exclusion operations advantageously provide for the stripping out of uninteresting information and help identify where bottlenecks are in the middle part of the execution tree.

The Flatten Symbol and Flatten Library operations can both collapse (or "flatten") a chain of symbols. Flatten Library does this for every symbol in a specified library, while Flatten Symbol collapses chains that include the specified symbol. Thus, a whole sub-tree of calls can be replaced with a single symbol. Such operations are useful for hiding extraneous information without losing all of it.

Flatten Library can eliminate or collapse functions occurring within a library. For example, if a developer is writing an application that uses a core framework such as AppKit, the functions called by her application into AppKit are of greater interest to the developer, rather than functions occurring within AppKit. For instance, the developer's application may call "-[NSTableView reloadData]" to instruct the NSTableView that the data has changed and that it must reload the data. To reload the table data, it will typically query the table's data source for information about the table and make various internal calls in order to implement various tasks, e.g., autosize the columns, adjust the row heights, etc. These internal calls are implementation details of NSTableView that are not usually of interest to the developer. Hence, it is generally preferable is to treat functions such as "-[NSTableView reloadData]" as a "black box" that is called by the application and calls out to the application.

Flatten Symbol collapses chains of functions that include a given symbol. For example, consider the tree structure shown below in Table 1:

TABLE 1

| Count | Function |
|-------|----------|
| 5 | main |
| 5 |   foo |
| 3 |     bar |
| 1 |       bar |
| 1 |         bar |
| 1 |           bar |
| 1 |             mumble |
| 2 |     bar |
| 1 |       bar |
| 1 |         mumble |

TABLE 1-continued

| Count | Function |
|---|---|
| 1 | kah |
| 2 | bar |
| 1 | mumble |
| 1 | hehe |

The Flatten Symbol operation on the symbol "bar" would advantageously collapse repeated entries of "bar," such that the call tree would be condensed to a tree such as that shown below in Table 2:

TABLE 2

| Count | Function | | |
|---|---|---|---|
| 5 | main | | |
| 5 | foo | | |
| 5 | bar | | |
| 3 | | mumble | |
| 1 | | kah | |
| 1 | | hehe | |

The Flatten operations are particularly useful for flattening recursive calls in order to facilitate understanding calling behavior.

Focus operations allow the user to look at just a specific portion of the call tree. For example, Focus Symbol shows a particular function and its descendants (i.e., the functions that are called during its invocation). The portions of the callstack that are callers of that function or callstacks that do not contain the specified function are removed from the outline. Thus, when focusing on a particular symbol, the specified symbol (function) and its descendants are displayed.

For example, consider the tree structure shown below in Table 3:

TABLE 3

| foo | | | | | libA |
|---|---|---|---|---|---|
| | bar | | | | libB |
| | | mumble | | | libB |
| | | | blah | | libB |
| | | | | kah | libC |
| | doh | | | | libB |
| | | tata | | | libB |
| | | | haha | | libD |

Focus Symbol on the symbol "mumble" would result in a significantly pruned call tree such as the call tree shown below in Table 4:

TABLE 4

| mumble | | libB |
|---|---|---|
| | blah | libB |
| | kah | libC |

Figure 12:
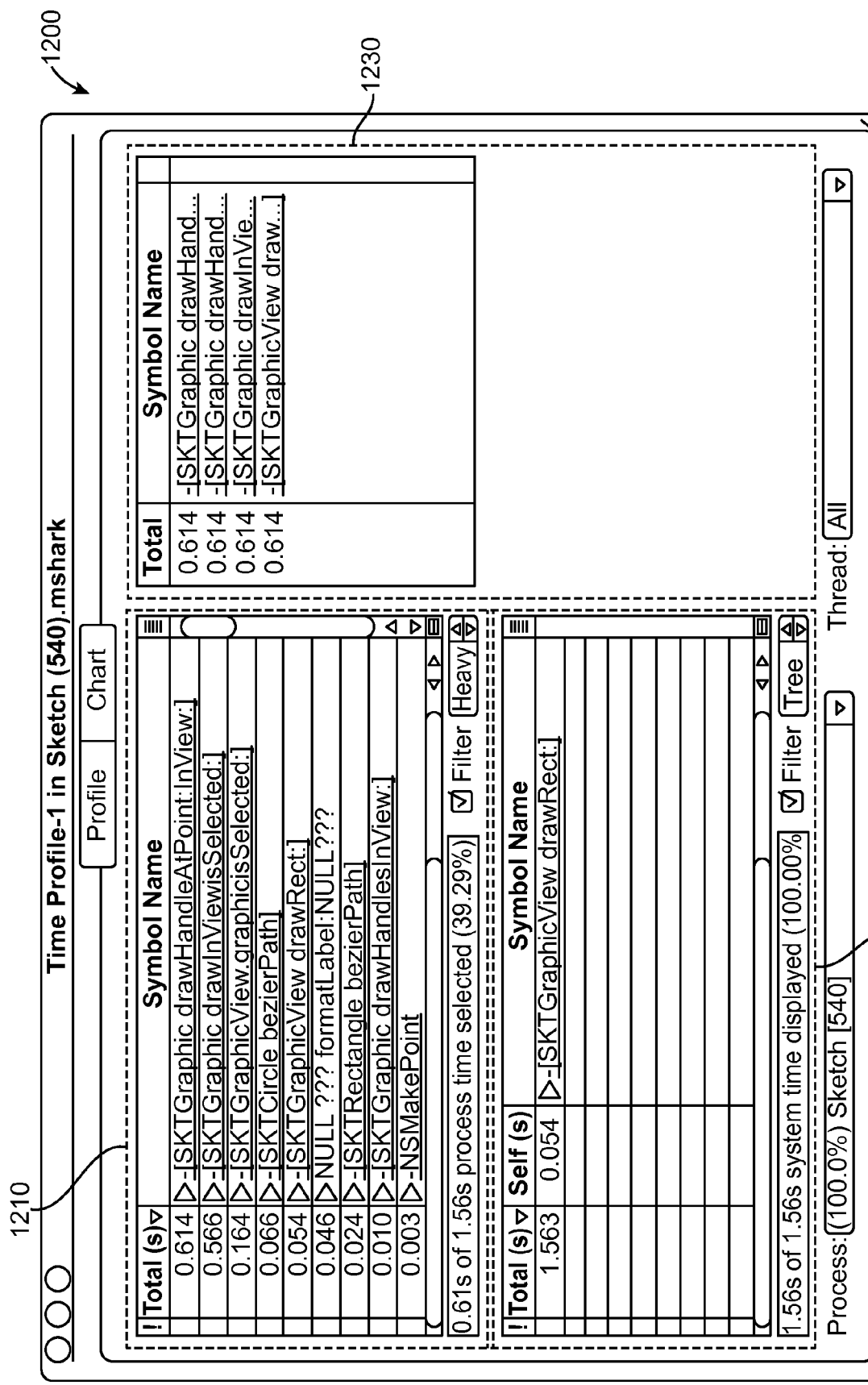
FIGS. 12-13 depict exemplary callstack tables (tree view and heavy view).

As another example, referring back to FIG. 3, if the operation Focus Symbol on "-[SKTGraphicView drawRect:]" is performed, the result may be the display of a dual-tree view such as the profile 1200 shown in FIG. 12, which includes both a bottom-up call tree (heavy view) 1210 and a top-down call tree (heavy view) 1220, as well as a callstack 1230. The heavy view (1220) is now rooted on the symbol that is being focused on, and the items in the tree view (1210) reflect only the leaf times relative to the execution tree under this new root. In the heavy view, it appears that the most time is spent in "-[SKTGraphic drawHandleAtPoint:inView]."

Advantageously, in accordance with certain embodiments of the present invention, when focusing on a function, two call trees can be displayed concurrently: (1) a top-down call tree showing the paths from the focused function to all leaf functions in the tree of functions called by it; and (2) an inverted, bottom-up call tree showing the paths from the bottom-most leaf functions to the focused function. The cost of a function can be charged to the calling function, in either the top-down or bottom-up tree. The dynamic behavior within the focused function can be better appreciated when the two views are presented concurrently. By viewing both trees, one can more readily ascertain the commonality as well as the differences.

The Focus Library operation is similar to the Focus Symbol operation, but it is applied to each function in a particular library. When focusing on a specified library, all of that library's functions and all functions called by the library's functions are displayed. For example, Focus Library on libB in the call tree of Table 3 would result in a pruned call tree such as the call tree shown below in Table 5:

TABLE 5

| bar | | | | libB |
|---|---|---|---|---|
| | mumble | | | libB |
| | | blah | | libB |
| | | | kah | libC |
| doh | | | | libB |
| | tata | | | libB |
| | | haha | | libD |

The Focus Callers of Symbol operation is best understood as the inverse of the Focus on Symbol operation. It removes all functions called by a particular function, leaving only the chains between main and the function of interest. It also removes all callstacks that do not contain the specified function from the outline. For example, Focus Callers of Symbol on b2 in the call tree of Table 3 would result in a pruned call tree such as the call tree shown below in Table 6:

TABLE 6

| foo | | libA |
|---|---|---|
| | bar | libB |
| | mumble | libB |

The Focus Callers of Library operation is similar to Focus Callers of Symbol, but it is applied to every symbol in a particular library. For example, Focus Callers of Library on libB in the call tree of Table 3 would result in a pruned call tree such as the call tree shown below in Table 7:

TABLE 7

| foo | | | | libA |
|---|---|---|---|---|
| | bar | | | libB |
| | | mumble | | libB |
| | | | blah | libB |
| | doh | | | libB |
| | | tata | | libB |

Thus, it should be appreciated that by applying the data mining and filtering techniques of the present invention to call stack samples, application developers can better analyze their code by eliminating uninteresting information and focusing on the information of interest. In accordance with one embodiment of the present invention, the principles of the present invention may find application in the context of processing crashlogs. Various software systems provide mechanisms for users to submit crash logs of crashed applications to the system vendor. With large numbers of users of complex software applications, a large number of crash logs can be received daily, making it difficult and cumbersome to review the crash logs and ultimately fix the problems that are causing the crashes. By applying the filtering techniques of the present invention to crash logs, massive amounts of data from crash logs can be automatically consolidated, classified, and prioritized.

Crashes of a given application can be sampled by parsing the crashed thread backtrace in each crash report for that application. Each of the crashed thread backtraces can then be added to a trace table representing all crashes of the application. Then, a single top-down function call tree can be created from that trace table. Finally, that top-down function call tree can be inverted, creating a list (in frequency order) of all leaf functions that the application was in when it crashed. Each leaf function also has the bottom-up function call tree that led to that leaf function.

Filtering rules or operations can be applied to "hide" all leaf function calls that occurred in core system libraries that would not differentiate one type of crash from a different type of crash. The result of filtering is a list of the "meaningful" application-level "unique crash points" in that application or the higher-level frameworks that it uses. The full list, including the function call tree leading to each unique crash point, and the function call tree leading from it to the actual leaf functions where the actual crash appeared can be provided. Showing that latter function call tree allows developer or debugger to quickly validate that a good set of default function call filtering rules in being applied.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as exemplary embodiments. Various modifications may be made without departing from the scope of the invention. For example, equivalent elements or materials may be substitute for those illustrated and described herein, and certain features of the invention may be utilized independently of the use of other features, all as would be apparent to one skilled in the art after having the benefit of this description of the invention. In addition, the terms "a" and "an" are generally used in the present disclosure to mean one or more.

As one of ordinary skill in the art will appreciate, storage devices (sometimes called "program storage devices" or "computer-readable medium") suitable for tangibly embodying program instructions include, but are not limited to: magnetic disks, tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

We claim:

1. A method for code execution analysis, the method comprising:
    obtaining a plurality of callstack samples pertaining to one or more processes executing on a computer system;
    displaying at least two call tree functions from an operation of the one or more processes wherein a first call tree is inverted relative to a second call tree;
    concurrently displaying the first call tree indicating paths leading to the processes bottom-most leaf functions from a specified function and a second call tree indicating paths from the specified function to leaf functions called from the specified function, wherein the first call tree or the second call tree comprises a filtered call tree of functions, and wherein one or more functions from the callstack samples have been excluded from the filtered call tree; and
    for each excluded function, propagating a cost associated with the excluded function to each caller of the excluded function.

2. The method of claim 1, wherein the cost comprises an amount of processor time spent executing the excluded function.

3. The method of claim 1, wherein one or more areas of code have been hidden to create the filtered call tree of functions.

4. The method of claim 3 wherein user code has been hidden.

5. The method of claim 3 wherein supervisor code has been hidden.

6. The method of claim 3 wherein functions contained in a specified library have been hidden.

7. A non-transitory computer-readable medium having computer-executable instructions that, when executed, cause a programmable processor to:
    obtain a plurality of crashed threaded backtraces of an application;
    create a trace table representing the plurality of crashed threaded backtraces;
    create a top-down function call tree from the trace table;
    invert the top-down function call tree to create a second call tree indicating a list of all leaf functions that the application was in when it crashed;
    concurrently display the top-down function call tree and the second call tree, wherein the first call tree or the second call tree comprises a filtered call tree of functions, and wherein one or more functions from the callstack samples have been excluded from the filtered call tree; and
    for each excluded function, propagating a cost associated with the excluded function to each caller of the excluded function.

8. The non-transitory computer-readable medium of claim 7, wherein the cost comprises an amount of processor time spent executing the excluded function.

9. The non-transitory computer-readable medium of claim 7, wherein one or more areas of code have been hidden to create the filtered call tree of functions.

10. The non-transitory computer-readable medium of claim 7, wherein the second call tree indicates the list in frequency order.

11. The non-transitory computer-readable medium of claim 7, wherein the top-down function call tree or the second call tree comprises a filtered call tree of functions.

12. The non-transitory computer-readable medium of claim 11, wherein one or more functions from the call tree have been excluded from the filtered call tree.

13. The non-transitory computer-readable medium of claim 11, wherein one or more areas of code have been hidden to create the filtered call tree of functions.

14. The non-transitory computer-readable medium of claim 13, wherein functions contained in a specified library have been hidden.

* * * * *